United States Patent Office 3,197,501
Patented July 27, 1965

3,197,501
METHANE SULFONATE DERIVATIVES OF ARALKYL HYDRAZINES
John H. Biel, Milwaukee, Wis., assignor, by mesne assignments, to Colgate-Palmolive Company, a corporation of Delaware
No Drawing. Filed July 30, 1958, Ser. No. 751,886
7 Claims. (Cl. 260—508)

This invention relates to aralkyl hydrazines. More particularly, this invention is concerned with novel methanesulfonate derivatives of aralkyl hydrazines, methods of producing these compounds, and medical uses for such compounds.

According to the present invention there are provided novel compounds of the formula

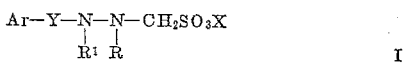

wherein Ar is an aryl or nuclear substituted aryl group such as the phenyl, halophenyl, lower alkyl-phenyl, lower alkoxy-phenyl, hydroxyphenyl, aminophenyl, methylenedioxyphenyl, naphthyl, thienyl or furyl group, Y is a straight or branched alkylene chain of not more than five carbons, R is hydrogen, methanesulfonic acid or an alkali metal salt thereof, a lower alkyl group, an aralkyl group such as a phenyl-lower alkyl group, hydroxyalkyl groups, lower alkenyl groups, aryl groups and particularly the phenyl and nuclear substituted phenyl groups, cycloalkyl groups, alkynyl groups, an acyl group such as the glutamyl and isonicotinyl groups and groups derived from lower monocarboxylic acids, or the 5-pyrrolidone-2-carboxyl group, $R^1$ is hydrogen, an alkyl group, an aralkyl group such as benzyl or phenethyl, a cycloalkyl group, or a hydroxyalkyl group, and X is hydrogen or an alkali metal.

Those compounds of Formula I in which R is hydrogen or a methanesulfonic acid group or alkaki metal salt thereof are readily produced by reacting an appropriate aralkyl hydrazine with sufficient formaldehyde and an alkali metal bisulfide to form an intermediate aralkyl hydrazine di-alkali metal dimethanesulfonate which may then be hydrolyzed to form the aralkyl hydrazine methanesulfonate. This reaction may be represented as follows:

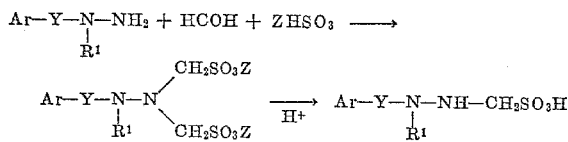

wherein Ar, Y, and $R^1$ have the significance previously assigned and Z is an alkali metal.

Those compounds of Formula I in which R is a group other than hydrogen or methanesulfonic acid or a salt thereof are also produced by reacting the appropriate hydrazine with formaldehyde and an alkali metal bisulfite but, since R is not hydrogen, only one methane sulfonic acid group is introduced initially on the hydrazine compound. This reaction may be represented as follows:

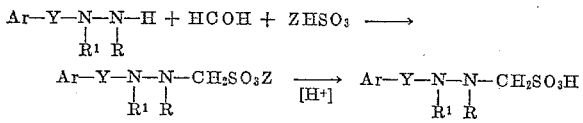

wherein Ar, Y, $R^1$, R and Z have the significance previously assigned except that R is not hydrogen or methane sulfonic acid or an alkali metal salt thereof.

Among the starting materials which may be used in these processes are 2-phenylethylhydrazine, N-(3-phenyl-2-proply)hydrazine, N-phenylpentyl-N-methyl hydrazine, N-(p-chlorophenylpropyl)-N-benzyl hydrazine, N-3,4-methylenedioxyphenylethyl-N-cyclohexyl hydrazine, N-phenethyl-N-phenyl hydrazine, p-hydroxyphenylbutylhydrazine, N-phenylethyl-N-hydroxyethyl hydrazine, N-phenylpropyl-N'-ethyl hydrazine, N-phenylbutyl-N'-cyclohexyl hydrazine, N-3,4-methylenedioxyphenylethyl-N'-propyl hydrazine, N-phenylethyl-N'-phenyl hydrazine, N-phenylisopropyl-N'-isonicotinyl hydrazine, benzylhydrazine, N-p-chlorobenzyl-N-ethyl hydrazine, N-p-methoxybenzyl-N-phenethyl hydrazine, N-[α-methyl-(3,4-methylenedioxy)benzyl]-N-methyl hydrazine, α-methylbenzyl hydrazine, 1-phenylmethyl-2-acetyl hydrazine, 1-phenylethyl-2-propionyl hydrazine, 1-phenylpropyl-2-benzoyl hydrazine, 1-phenylethyl-2-cyclohexylacetyl hydrazine, 1-phenylisopropyl-2-benziloyl hydrazine and similar compounds such as are disclosed in my copending applications Serial No. 716,876, filed February 24, 1958; Serial No. 716,878, filed February 24, 1958, now abandoned; Serial No. 716,877, filed February 24, 1958, now abandoned, and Serial No. 716,047, filed February 19, 1958, now abandoned.

Reaction between the hydrazine, formaldehyde and alkali metal bisulfite is readily effected by bringing the reactants together in a liquid reaction medium, advisably water, and refluxing the mixture with stirring. Equimolar quantities of the reactants are generally employed. A reflux time of about one to five hours is usually adequate for substantially complete reaction to take place. The desired reaction product may be readily recovered from the reaction mixture by conventional methods such as concentrating the mixture to dryness and crystallizing the product from a solvent in which it is not more than sparingly soluble.

Those compounds produced from N',N'-di-unsubstituted-N-aralkyl hydrazines have two methanesulfonate groups bonded to the same nitrogen of the hydrazine moiety. By treating such compounds with a strong acid, such as hydrochloric acid, one of the methanesulfonate groups is hydrolyzed off to produce an aralkyl hydrazine methanesulfonic acid. A salt of the acid may be readily produced by treating the acid with an alkali metal base such as a hydroxide or carbonate. The alkali metal methanesulfonates are readily converted to the free hydrazine methanesulfonic acid by treating the salts with a suitable acid, and preferably hydrochloric acid.

Representative of the novel compounds provided by this invention are 1-phenyl-2-propyl hydrazine di-sodium dimethane sulfonate, 1-phenyl-2-propyl hydrazine methanesulfonic acid, 2-phenylethylhydrazine potassium methanesulfonate, N-phenylpentyl-N-methyl hydrazine methane sulfonic acid, N-p-chlorophenylpropyl-N-benzyl hydrazine di-sodium di-methane sulfonate, N-phenylpropyl-N'-ethyl hydrazine methanesulfonic acid, N-3,4-methylenedioxyphenylethyl - N'-propyl hydrazine methanesulfonic acid, N-phenylisopropyl-N'-isonicotinyl hydrazine sodium methane sulfonate, benzylhydrazine sodium methane sulfonate, 1-phenylmethyl-2-acetyl hydrazine methanesulfonic acid, 1-phenylpropyl-2-benzoyl hydrazine sodium methanesulfonate and similar methane sulfonic acid derivatives of the other hydrazine starting materials named above.

The aralkyl hydrazine methane sulfonic acids and alkali metal salts thereof are stable solids whereas the starting hydrazines are usually liquids, some of which are not completely stable.

The compounds provided by this invention are potent agents for stimulating the central nervous system. In addition, the compounds are potent inhibitors of the enzyme monoamine oxidase which is responsible for the destruction of such central excitatory amines as norepinephrine and 3-hydroxytyramine (dopamine). By preventing or retarding destruction of these amines in the brain their level is maintained higher for longer periods of time so that sympathetic characteristics such as increased awareness and motility result.

The compounds of highest potency appear to be the methane sulfonic acid derivatives of 1-phenyl-2-propyl hydrazines and particularly 1-phenyl-2-propyl hydrazine methanesulfonic acid, 1-phenyl-2-propyl hydrazine sodium methanesulfonate and 1-phenyl-2-propyl hydrazine di-sodium di-methanesulfonate. At doses of 8 to 10 mg./kg. administered intraperitoneally to mice, these compounds reversed for a long period of time the sedative effect produced by reserpine.

The compounds of this invention may be administered to animals as pure compounds. It is advisable, however, to first combine one or more of the compounds with a suitable pharmaceutical carrier to attain a more satisfactory size to dosage relationship.

Pharmaceutical carriers which are liquid or solid may be used. The preferred liquid carrier is water. Flavoring materials may be included in the solutions as desired.

Solid pharmaceutical carriers such as starch, sugar, talc and the like may be used to form powders. The powders may be used as such for direct administration or, instead, the powders may be added to suitable foods and liquids, including water, to facilitate administration.

The powders also may be used to make tablets, or to fill gelatin capsules. Suitable lubricants like magnesium stearate, binders such as gelatin, and disintegrating agents like sodium carbonate in combination with citric acid may be used to form the tablets.

Unit dosage forms such as tablets and capsules may contain any suitable predetermined amount of one or more of the methanesulfonic acid derivatives, and may be administered one or more at a time at regular intervals. Such unit dosage forms, however, should generally contain a concentration of 0.1% to 10% by weight of one or more of the active hydrazines.

A typical tablet may have the composition:

| | Mg. |
|---|---|
| (1) 1-phenyl-2-propyl hydrazine sodium methanesulfonate | 10 |
| (2) Starch, U.S.P. | 57 |
| (3) Lactose, U.S.P. | 73 |
| (4) Talc, U.S.P. | 9 |
| (5) Stearic acid | 6 |

Powders 1, 2 and 3 are slugged, then granulated, mixed with 4 and 5, and tableted.

The following examples illustrate the preparation of specific compounds within the scope of this invention.

EXAMPLE 1

*1-phenyl-2-propyl hydrazine di-sodium dimethanesulfonate*

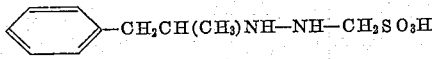

To a solution of 15.7 g. (0.15 mole) of sodium bisulfite in 25 cc. of water and 10.3 cc. (0.14 mole) of 37% formalin was added dropwise 20.3 g. (0.135 mole) of 1-phenyl-2-propyl hydrazine. After completon of the addition, the mixture was refluxed for two hours, concentrated in vacuo and the residue crystallized from 450 cc. of isopropyl alcohol. The solid precipitate was removed by filtration, yield 27.2 g. (94.7%).

*Analysis.*—Calcd. for $C_{11}H_{16}Na_2N_2O_6S_2$: N, 7.33; Na, 12.03. Found: N, 7.99; Na, 12.03.

EXAMPLE 2

*1-phenyl-2-propyl hydrazine methanesulfonate*

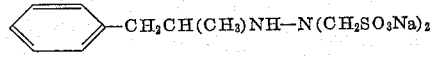

To 5.73 g. (0.015 mole) of the di-sodium salt of Example 1 in 50 cc. of water was added 7.3 g. (0.075 mole) of concentrated hydrochloric acid. On standing for several days, a white precipitate formed. It was separated by filtration, yield 3.11 g. (85%); M.P. 133–135° C.

*Analysis.*—Calcd. for $C_{10}H_{16}N_2SO_3$: N, 11.47; S, 13.13. Found: N, 11.16; S, 13.31.

Various changes and modifications of the invention can be made and, to the extent that such variations incorporate the spirit of this invention, they are intended to be included within the scope of the appended claims.

What is claimed is:

1. A compound of the formula

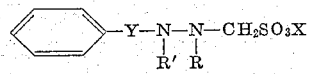

wherein Y is an alkylene group having not more than five carbons, R is a member selected from the group consisting of hydrogen, methanesulfonic acid, alkali metal methanesulfonates, lower alkyl, lower alkanoyl, benzoyl, isonicotinyl, glutamyl, benziloyl, 5-pyrrolidone-2-carbonyl, aryl, and cycloalkyl, R' is a member of the group consisting of hydrogen, alkyl, aralkyl, cycloalkyl and hydroxalkyl and X is a member of the group consisting of hydrogen and alkali metal.

2. A compound of the formula

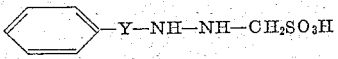

wherein Y is an alkylene of not more than five carbons.

3. A compound of the formula

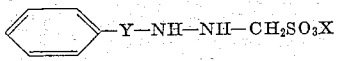

wherein Y is an alkylene of not more than five carbons and X is an alkali metal.

4. A compound of the formula

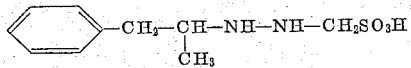

5. A compound of the formula

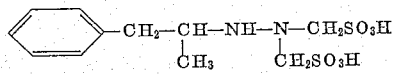

6. A compound of the formula

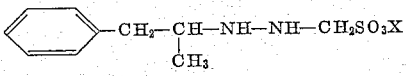

wherein X is an alkali metal.

7. A compound of the formula

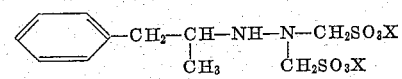

wherein X is an alkali metal.

References Cited by the Examiner

UNITED STATES PATENTS

| | | | |
|---|---|---|---|
| 2,195,789 | 4/40 | Schmid | 260—510 |
| 2,589,258 | 3/52 | Howard. | |
| 2,759,944 | 8/56 | Logemann | 260—295 |
| 2,784,220 | 3/57 | Spiegler | 260—510 |
| 2,854,379 | 9/58 | Fancher | 167—65 |
| 2,872,374 | 2/59 | Beiler | 167—65 |

OTHER REFERENCES

Backer et al.: Rec. Trav. Chem., vol. 53, 1934, pages 1120, 1124–1127.

Byrkit et al.: "Ind. & Eng. Chem.," vol. 42, page 1862 (1950).

Beilstein: Handbuch der Organischen Chemie, vol. XV, SN II, 4th ed., 1951, pages 244, 248.

References Cited by the Applicant

Nature, vol. 185, p. 532, Feb. 20, 1960.

LORRAINE A. WEINBERGER, *Primary Examiner.*

WILLIAM B. KNIGHT, LEON ZITVER, *Examiners.*